（12）United States Patent
Yi et al.

(10) Patent No.: US 6,840,885 B2
(45) Date of Patent: Jan. 11, 2005

(54) SIX-SPEED POWERTRAIN AND HYDRAULIC CONTROL SYSTEM FOR AUTOMATIC TRANSMISSION

(75) Inventors: Jae-Shin Yi, Suwon (KR); Jae-Duk Jang, Yongin (KR)

(73) Assignee: Hyundai Motor Company, Seocho-Ku (KR)

( * ) Notice: Subject to any disclaimer, the term of this patent is extended or adjusted under 35 U.S.C. 154(b) by 22 days.

(21) Appl. No.: 10/322,139

(22) Filed: Dec. 17, 2002

(65) Prior Publication Data

US 2004/0002404 A1 Jan. 1, 2004

(30) Foreign Application Priority Data

Jun. 27, 2002 (KR) .................................... 2002-0036402

(51) Int. Cl.[7] ........................... F16H 3/62; F16H 31/00; F16H 59/30; F16H 61/26
(52) U.S. Cl. ....................... 475/276; 475/119; 475/120; 475/127; 475/133; 475/281; 477/122; 477/127
(58) Field of Search ................................ 475/276, 114, 475/119, 116, 120, 127, 130–133, 280–287, 293, 311–313, 317–319, 323–325; 477/69, 127, 121–123, 130, 156

(56) References Cited

U.S. PATENT DOCUMENTS

| 3,956,946 | A | * | 5/1976 | Murakami et al. | 475/276 |
|---|---|---|---|---|---|
| 3,971,268 | A | * | 7/1976 | Murakami et al. | 475/276 |
| 5,288,279 | A | * | 2/1994 | Sakai et al. | 475/127 |
| 5,460,579 | A | * | 10/1995 | Kappel et al. | 475/276 |
| 5,772,552 | A | * | 6/1998 | Ibaraki et al. | 475/281 |
| 6,139,469 | A | * | 10/2000 | Jang | 477/130 |
| 6,200,242 | B1 | * | 3/2001 | Coffey | 475/281 |
| 6,217,474 | B1 | * | 4/2001 | Ross et al. | 475/269 |
| 6,464,611 | B2 | * | 10/2002 | Futamura et al. | 475/128 |
| 6,547,688 | B2 | * | 4/2003 | Takagi et al. | 475/276 |
| 6,620,075 | B2 | * | 9/2003 | Kao et al. | 475/275 |
| 6,705,967 | B2 | * | 3/2004 | Raghavan et al. | 475/275 |
| 6,705,969 | B2 | * | 3/2004 | Bucknor et al. | 475/290 |
| 2003/0008747 | A1 | * | 1/2003 | Tabata et al. | 475/276 |
| 2003/0040389 | A1 | * | 2/2003 | Kim et al. | 475/128 |
| 2004/0077452 | A1 | * | 4/2004 | Ishimaru et al. | 475/271 |
| 2004/0106490 | A1 | * | 6/2004 | Park | 475/275 |

FOREIGN PATENT DOCUMENTS

| JP | 2000145901 A | * | 5/2000 | ............ F16H/3/66 |
|---|---|---|---|---|
| JP | 2003262268 A | * | 9/2003 | ........... F16H/61/12 |
| KR | 2003065759 A | * | 8/2003 | ........... F16H/61/00 |

* cited by examiner

Primary Examiner—Tisha Lewis
(74) Attorney, Agent, or Firm—Morgan Lewis & Bockius LLP

(57) ABSTRACT

The powertrain of a six-speed powertrain and a hydraulic control system includes a main shift section of first and second single pinion planetary gearsets, in which a first planet carrier is fixedly connected to a second ring gear. The powertrain also includes a first ring gear fixedly connected to a second planet carrier, and a first sun gear. The second planet carrier, and a second sun gear are variably connected to an input shaft through first, second, and third clutches, respectively. A connecting member connecting the first ring gear and the second planet carrier is variably connected to a housing through a first brake and a first one-way clutch. The second sun gear being variably connected to the housing by a second brake. The powertrain also includes a secondary shift section realized through a third single pinion planetary gearset, in which a third sun gear is connected to a third planet carrier via a fourth clutch, and is also connected to the housing through a third brake and a second one-way clutch.

18 Claims, 5 Drawing Sheets

| Operational element | Clutch | | | | Brake | | | F1 | F2 |
|---|---|---|---|---|---|---|---|---|---|
| | C1 | C2 | C3 | C4 | B1 | B2 | B3 | | |
| Shift-speed 1st Speed | ● | | | | ● | | ● | ● | ● |
| 2nd Speed | ● | | | | | ● | ● | | ● |
| 3rd Speed | ● | ● | | | | | ● | | ● |
| 4th Speed | | ● | | | | ● | ● | | ● |
| 5th Speed | ● | ● | | ● | | | | | |
| 6th Speed | | | | | | | | | |
| N,P | | | | | | | | | |
| R | | | | | | | | | |

SIX-SPEED POWERTRAIN AND HYDRAULIC CONTROL SYSTEM FOR AUTOMATIC TRANSMISSION

FIELD OF THE INVENTION

The present invention relates to a six-speed powertrain and a hydraulic control system for an automatic transmission that helps to improve power performance and reduce fuel consumption.

BACKGROUND OF THE INVENTION

Conventional automatic transmissions used in vehicles typically include a torque converter, a powertrain realized through a multi-stage gearshift mechanism that is connected to the torque converter, and a hydraulic control system that selectively operates one of a plurality of operational elements of the powertrain according to a driving state of the vehicle.

The powertrain is provided through a compound planetary gearset that combines at least two simple planetary gearsets to control shifters into a required shift range, and a plurality of friction elements. The friction elements are selectively engaged by hydraulic pressure supplied from the hydraulic control system to achieve shifting.

The powertrain may be configured differently depending on the manufacturer, but most automatic transmissions now used are four-speed automatic transmissions. However, much attention is being given to the development of five-speed automatic transmissions, which are being introduced into some vehicles. Four or five speeds are nevertheless inadequate in many instances in that the difference in gear ratios between the different speeds is large, which leads to an undesirable jerking motion during shifting, and high fuel consumption.

SUMMARY OF THE INVENTION

The present invention provides a six-speed powertrain and a hydraulic control system for operating the powertrain such that engine power is efficiently used to improve power performance and shift feel, and reduce fuel consumption.

The present invention provides a six-speed powertrain for a vehicle including a main shift section realized through first and second single pinion planetary gearsets, in which a first planet carrier, which acts as an output element, is fixedly connected to a second ring gear. A first ring gear is fixedly connected to a second planet carrier, and a first sun gear, the second planet carrier, and a second sun gear are variably connected to an input shaft with first, second, and third clutches respectively interposed therebetween. A connecting member connecting the first ring gear and the second planet carrier is variably connected to a housing through a first brake and a first one-way clutch. The second sun gear is variably connected to the housing by a second brake. A secondary shift section is provided by a third single pinion planetary gearset, in which a third sun gear is connected to a third planet carrier, which operates as an output element, with a fourth clutch interposed therebetween, and is connected also to the housing through a third brake and a second one-way clutch. The main shift section and the secondary shift section are mounted along the same axis.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
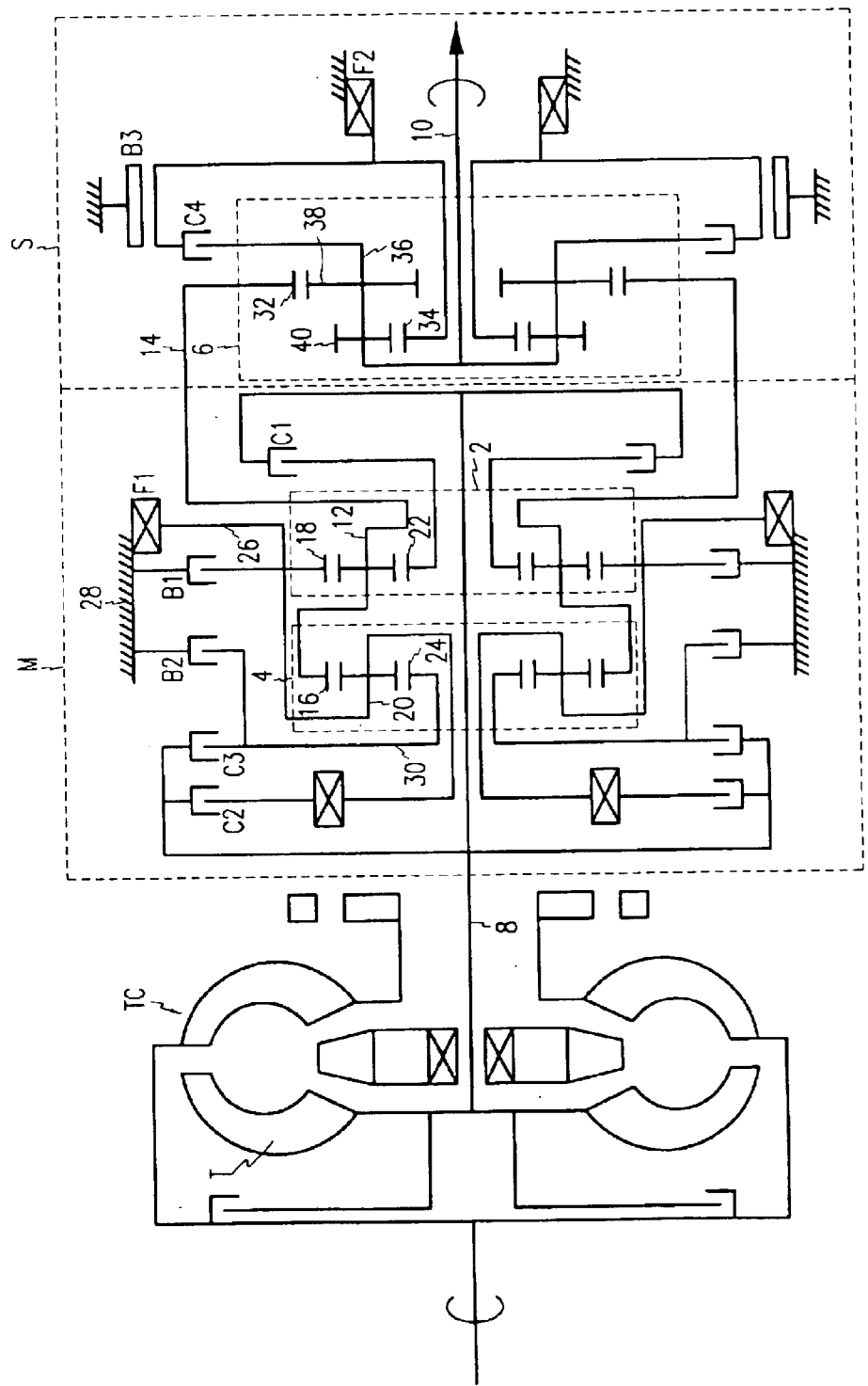
FIG. 1 is a schematic diagram of a six-speed powertrain according to a preferred embodiment of the present invention.

FIG. 1 is a schematic diagram of a six-speed powertrain according to a preferred embodiment of the present invention. The powertrain includes a main shift section M obtained through first and second single pinion planetary gearsets 2 and 4, and a secondary shift section S realized through a third single pinion planetary gearset 6. The main shift section M and the secondary shift section S are mounted on an input shaft 8 and an output shaft 10, respectively, which are provided with their long axes substantially aligned.

The input shaft 8 of the main shift section M receives rotational force from a turbine T of a torque converter TC, and transmits torque to the first and second single pinion planetary gearsets 2 and 4. Shifting is achieved by the complementary operation of the first and second single pinion planetary gearsets 2 and 4, and clutch hookup is achieved through a power transmission member 14 that is connected to a first planet carrier 12 of the first single pinion planetary gearset 2 such that output occurs through the third single pinion planetary gearset 6.

In the main shift section M, the first planet carrier 12, which acts as an output element, is fixedly connected to a second ring gear 16; a first ring gear 18 is fixedly connected to a second planet carrier 20; and a first sun gear 22, the second planet carrier 20, and a second sun gear 24 are variably connected to the input shaft 8 with first, second, and third clutches C1, C2, and C3 respectively interposed therebetween to thereby realize three input elements.

Further, a connecting member 26 that interconnects the first ring gear 18 and the second planet carrier 20 is variably connected to a housing 28 by a first brake B1 and a first one-way clutch F1, which are mounted in parallel. A midportion of a connecting member 30 that connects the second sun gear 24 and the third clutch C3 is variably connected to the housing 28 by a second brake B2.

In the secondary shift section S, a third ring gear 32 is connected to the power transmission member 14 which is connected to the first planet carrier 12 of the main shift section M, to act as an input element. Also, a third sun gear 34 is connected to a third planet carrier 36, which operates as an output element, with a fourth clutch C4 interposed therebetween, and is also connected to the housing 28 through a third brake B3 and a second one-way clutch F2.

The third single pinion planetary gearset 6 operating in the secondary shift section S includes a large pinion gear 38 and a small pinion gear 40, which are integrally formed and rotatably mounted to the third planet carrier 36. The large pinion gear 38 is meshed with the third ring gear 32, and the small pinion gear 40 is meshed with the third sun gear 34 to thereby output an ideal shift ratio.

For the clutch hookup of the powertrain, the first clutch C1 is mounted between the main shift section M and the secondary shift section S, the second clutch C2 is mounted to the torque converter TC, and the third clutch C3 is mounted between the second clutch C2 and the second single pinion planetary gearset 4. Further, the first brake B1 and the first one-way clutch F1 are mounted in parallel, and if one is engaged, the first ring gear 18 and the second planet carrier 20 act as fixed elements. The second brake B2 is mounted to the second sun gear 24 to selectively operate the second sun gear 24 as a fixed element.

The fourth clutch C4 is mounted to the third planet carrier 36, and the third brake B3 and the second one-way clutch F2 are mounted to the third sun gear 34. Accordingly, the fourth clutch C4 and the third brake B3 must operate simultaneously so that the third planet carrier 36 operates as a fixed element, and when the third sun gear 34 operates as a fixed element, operation of the fourth clutch C4 is unneeded.

Figures 2, 3:
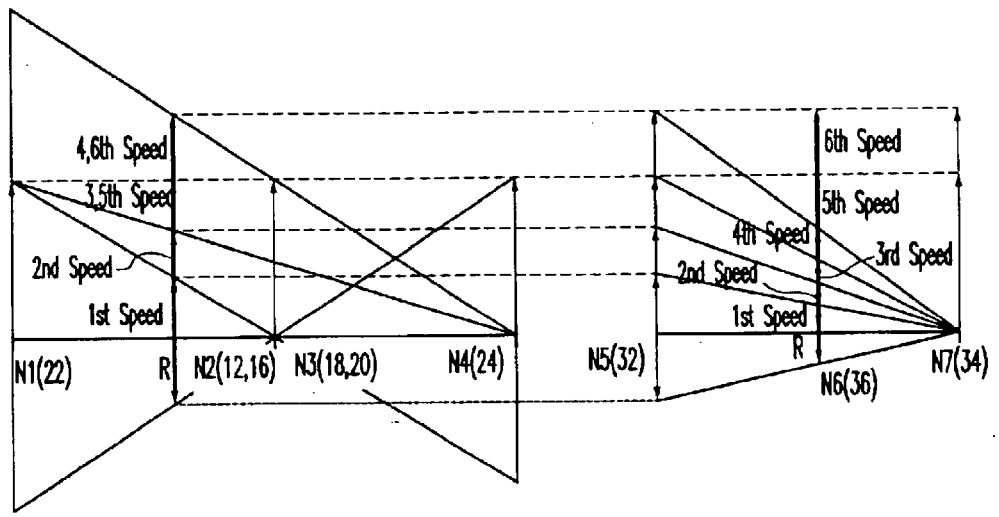
FIG. 2 is a lever diagram used to describe a shift process of the powertrain of FIG. 1.
FIG. 3 is an operational chart of friction elements of the powertrain of FIG. 1.

FIGS. 2 and 3 are respectively a lever diagram and an operational chart used to describe a shift process of the powertrain. In the main shift section M, the first planet carrier 12 and the second ring gear 16 are fixedly connected, and the first ring gear 18 and the second planet carrier 20 are fixedly connected. A first node N1 represents the first sun gear 22, a second node N2 represents the first planet carrier 12 and the second ring gear 16, a third node N3 represents the first ring gear 18 and the second planet carrier 20, and the fourth node N4 represents the second sun gear 24.

In the secondary shift section S, a fifth node N5 represents the third ring gear 32, a sixth node N6 represents the third planet carrier 36, and a seventh node N7 represents the third sun gear 34. The elements represented by the nodes are determined by the combination of the planetary gearsets. Since this is well known in the art, a detailed description thereof will be omitted.

First, in a state where input is not realized in the N (neutral) and P (park) ranges, the first and third brakes B1 and B3 are engaged. In this state, if the driver shifts a select lever to a drive D range, the first clutch C1 is additionally engaged in the neutral N range. With the engagement of the first clutch C1, input is realized through the first sun gear 22, and by the operation of the first brake B1, the first ring gear 18 and the second planet carrier 20 operate as fixed elements. Accordingly, the first node N1 operates as an input element, the third node N3 operates as a fixed element, and a first speed is output from the main shift section M through the second node N2.

As a result, input is realized through the third ring gear 32, which is an input element of the secondary shift section S, and the third sun gear 34 operates as a fixed element by the operation of the second one-way clutch F2 and the third brake B3. Therefore, the fifth node N5 operates as an input element and the seventh node N7 operates as a fixed element, such that ultimately the first speed is output through the sixth node N6 while reducing speed.

If vehicle speed is increased in such a first speed control state, a transmission control unit disengages the first brake B1 and engages the second brake B2. Accordingly, the fixed element in the main shift section M changes from the third node N3 to the fourth node N4, and output is realized in a state where a speed reduction ratio is lower than when in the first speed. In the secondary shift section S, a second speed is output while maintaining a state identical to the first speed.

If vehicle speed is increased in such a second speed state, the transmission control unit disengages the second brake B2 of the main shift section M and engages the second clutch C2, and simultaneously, the secondary shift section S maintains the second speed state. As a result, input is realized by the first and second clutches C1 and C2, which implies that the first and third nodes N1 and N3 operates as input elements. Therefore, the main shift section M rotates as one body, and output in the third speed is realized at the secondary shift section, while a reduction in speed at the secondary shift section is identical as in the first and second speeds.

If vehicle speed is increased in such a third speed state, the transmission control unit disengages the first clutch C1 of the main shift section M and engages the second brake B2. As a result, input is realized through the third node N3 in the main shift section M, and the fourth node N4 operates as a fixed element such that increased speed output is realized. Also, fourth speed output is realized from the secondary shift section S, while a reduced speed identical to the third speed is realized.

If vehicle speed is increased in such a fourth speed state, the transmission control unit disengages the second brake B2 of the main shift section M, engages the first clutch C1 of the main shift section M, and disengages the third brake B3 and engages the fourth clutch C4 of the secondary shift section S. Therefore, in the main shift section M, output is realized while changing into a direct drive state as in the third speed, and in the secondary shift section S, input is output as is while a direct drive state occurs by the engagement of the fourth clutch C4 such that fifth speed output occurs.

If vehicle speed is increased in such a fifth speed state, the transmission control unit disengages the first clutch C1 of the main shift section M, engages the second brake B2, operates the third node N3 as an input element, operates the fourth node N4 as a fixed element, and performs control to maintain a fifth speed state in the secondary shift section S. As a result, output is realized from the main shift section M in an overdrive state in which output is greater than input, and the secondary shift section S outputs this as is such that output of the highest sixth speed is realized.

Further, in a reverse R range, the third clutch C3 and the first brake B1 of the main shift section M are engaged such that input is realized through the fourth node N4 and the third node N3 operates as a fixed element. Further, in the secondary shift section S, the third brake B3 is engaged such that input is realized through the fifth node N5 and the seventh node N7 operates as a fixed element. As a result, reverse output is realized from the main shift section M and the secondary shift section S performs output after reducing the speed of the output of the main shift section M, thereby achieving reverse shifting.

The above shift processes, that is, speed relations of speed reductions and identical speeds (identical to the third speed) are shown in Table 1 below.

TABLE 1

|  |  | Main shift section | Secondary shift section |
|---|---|---|---|
| Drive | 1 | Speed reduction | Speed reduction |
|  | 2 | Speed reduction | Speed reduction |
|  | 5 | Identical speed (identical to third speed) | Identical speed |
| Reverse | 1 | Speed reduction | Speed reduction |

Figure 4:
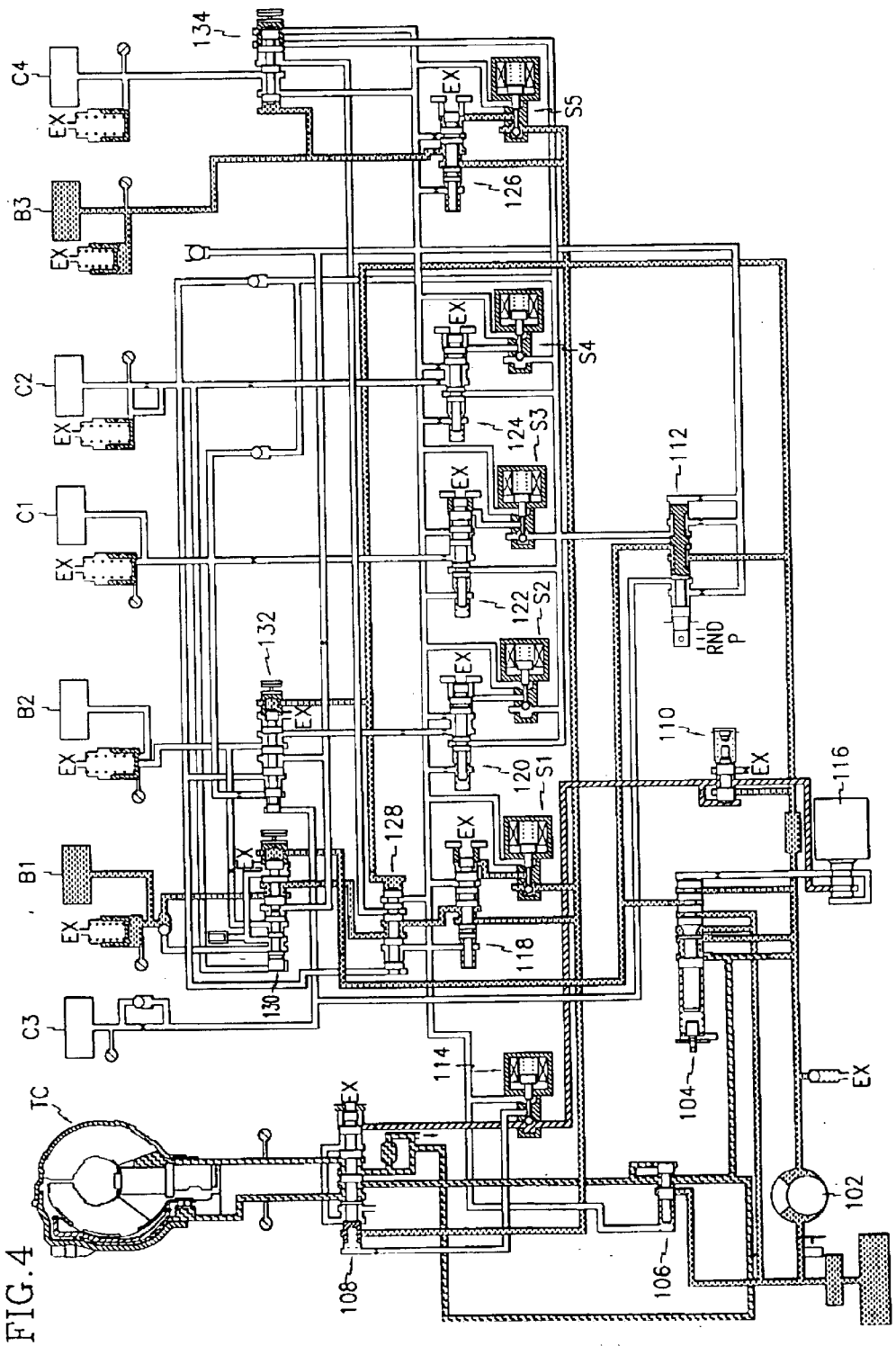
FIG. 4 is a circuit diagram of a hydraulic control system that operates the powertrain of FIG. 1 in which the flow of hydraulic pressure in an N range is shown.

A hydraulic control system that can perform control to realize shifting as described above is shown in FIG. 4. FIG. 4 is a circuit diagram of a hydraulic control system that operates the powertrain of FIG. 1 in which the flow of hydraulic pressure in an N range is shown. Hydraulic pressure generated in an oil pump 102 is supplied to a pressure regulating valve 104 that controls hydraulic pressure to a predetermined level, and to a damper clutch control valve 108 through a torque converter control valve 106, which controls hydraulic pressure for the torque converter and for lubrication to a predetermined level. The damper clutch control valve 108 increases a power transmission efficiency of the torque converter.

Further, part of the pressure generated in the oil pump 102 is supplied to a reducing valve 110, which reduces the hydraulic pressure to a level lower than line pressure, and to a manual valve 112, which is indexed with a select lever (not shown) manipulated by the driver to realize line conversion. Hydraulic pressure reduced by the reducing valve 110 is supplied to a solenoid valve 114 that controls the damper clutch control valve 108, and to a solenoid valve 116 that controls line pressure.

With the line conversion of the manual valve 112 by user manipulation of the select lever, hydraulic pressure is supplied to first, second, third, fourth, and fifth solenoid valves S1, S2, S3, S4, and S5, and depending on their control, is passed through a switch valve 128 or first, second, and third fail-safe valves 130, 132, and 134 or is supplied directly to friction elements via first, second, third, fourth, and fifth pressure control valves 118, 120, 122, 124, and 126. Accordingly, the friction elements are engaged and disengaged in each shift range as described above to realize shifting.

Figure 5:
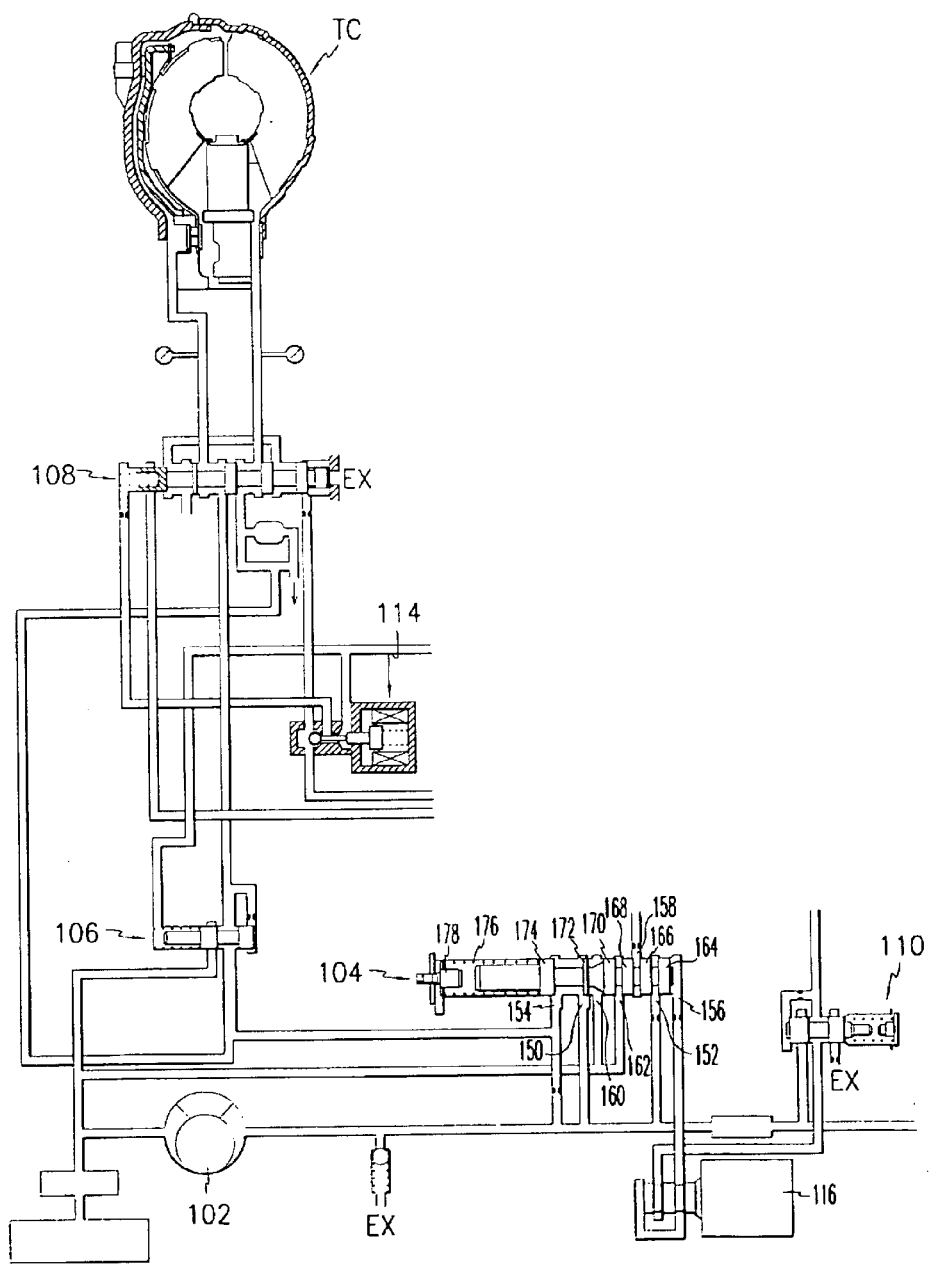
FIG. 5 is a partial view of FIG. 4 showing an area of a line regulating assembly.

FIG. 5 shows a portion of the hydraulic control system of FIG. 5 in more detail. That is, the drawing shows elements for controlling pressure and a damper clutch. The solenoid valve 116 operates as a device to regulate pressure.

Depending on vehicle speed and the shift range, the solenoid valve 116 proportionally controls the hydraulic pressure supplied from the reducing valve 110 and supplies the same to the pressure regulating valve 104. As a result, optimal line control is realized, unnecessary loss of power is prevented, and shift feel, or smooth vehicle motion during shifting, is improved.

The pressure regulating valve 104 includes a valve body and a valve spool mounted within the valve body. The valve body includes first, second, and third ports 150, 152, and 154 communicating with the oil pump 102; a fourth port 156 receiving control pressure of the solenoid valve 116 for controlling line pressure; a fifth port 158 receiving reverse pressure when in the reverse R range; a sixth port 160 that returns part of the hydraulic pressure supplied to the first port 150; and a seventh port 162 for returning hydraulic pressure remaining in the valve body.

The valve spool provided within the valve body includes a first land 164 on which hydraulic pressure supplied through the fourth port 156 acts, a second land 166 on which hydraulic pressure supplied through the second port 152 acts, a third land 168 on which hydraulic pressure supplied through the fifth port 158 acts, a fourth land 170 on which hydraulic pressure supplied through the seventh port 162 acts, a fifth land 172 that selectively opens and closes the first port 150 and the sixth port 160, and a sixth land 174 that opens and closes the third port 154. The sixth land 174 is elastically supported by a spring 176, and the other end of the spring 176 is secured by an adjust screw 178.

With this structure, the valve spool in the pressure regulating valve 104 moves within the valve body by the combination of control pressure supplied to the second, fourth, and fifth ports 152, 156, and 158 and by an elastic force of the spring 176. Also, opening areas of the first port 150 and the sixth port 160 are varied. By controlling these parameters, line pressure is controlled.

Since the torque converter control valve 106 and the damper clutch control valve 108 are structured and operate identically to conventional devices, a detailed description of these elements will not be provided herein.

Figure 6:
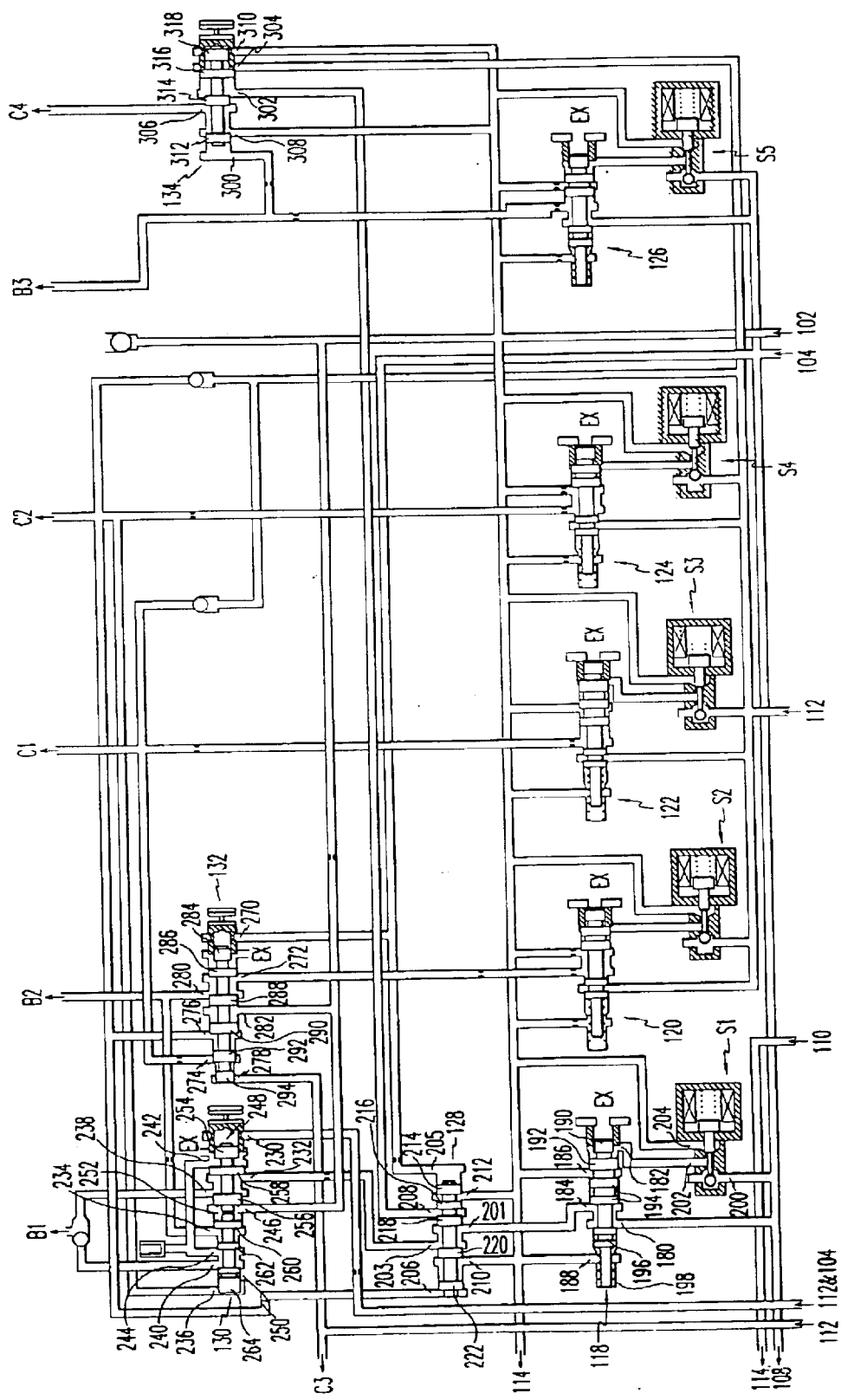
FIG. 6 is a partial view of FIG. 4 showing an area of a hydraulic control distribution assembly.

FIG. 6 is a partial view of FIG. 4 showing an area of a hydraulic control distribution assembly. The first solenoid valve S1 and the first pressure control valve 118 open and close the switch valve 128 and the first fail-safe valve 130 to be connected to the first brake B1, which is a low-reverse brake, and the second solenoid valve S2 and the second pressure control valve 120 open and close the second fail-safe valve 132 to be connected to the second brake B2.

Further, the third solenoid valve S3 and the third pressure control valve 122 are directly connected to the first clutch C1, which is an underdrive clutch; the fourth solenoid valve S4 and the fourth pressure control valve 124 are directly connected to the second clutch C2, which is an overdrive clutch; and the fifth solenoid valve S5 and the fifth pressure control valve 126 are directly connected to the third brake B3, which is a reduction brake, and they simultaneously supply control pressure of the third fail-safe valve 134.

In more detail, a valve body of the first pressure control valve 118 includes a first port 180 receiving line pressure, a second port 182 receiving control pressure of the first solenoid valve S1, a third port 184 supplying the hydraulic pressure supplied to the first port to the switch valve 128, and fourth and fifth ports 186 and 188 provided to both sides of the third port 184 with a predetermined gap therebetween.

A valve spool mounted within the valve body of the first pressure control valve 118 includes first and second lands 190 and 192 on which control pressure supplied through the second port 182 acts; a third land 194 that selectively communicates the third port 184 and the fourth port 186; and a fourth land 196, which, together with the third land 194, communicates the first port 180 with the third port 184, and the third port 184 with the fourth port 186. A spring 198 is interposed between the valve body and the fourth land 196.

Further, the first solenoid valve S1, which controls the first pressure control valve 118 and is a 3-way valve, includes a first port 200 that receives drive pressure, a second port 202 for selectively supplying the hydraulic pressure received through the first port 200 to the second port 182 of the pressure control valve 118, and a third port 204 for selectively exhausting the hydraulic pressure supplied to the second port 202.

Accordingly, when the first solenoid valve S1 is controlled to Off, control pressure is supplied to the second port 182 of the first pressure control valve 118 through the second port 202 such that a valve spool in the first solenoid valve S1 is displaced leftward (in the drawing) to thereby communicate the first port 180 and the third port 184. Also, when the first solenoid valve S1 is controlled to On, the hydraulic pressure supplied to the second port 202 is exhausted through the third port 204 and the valve spool of the first pressure control valve 118 is displaced rightward (in the drawing) by an elastic force of the spring 198 such that the third port 184 and the fourth port 186 communicate, thereby resulting in the exhaust of the hydraulic pressure supplied to the switch valve 128.

A valve body of the switch valve 128, which receives hydraulic pressure from the first pressure control valve 118, includes a first port 201 that receives hydraulic pressure from the first pressure control valve 128; a second port 203 for supplying the hydraulic pressure supplied to the first port 201 to the first fail-safe valve 130; a third port 205 that receives drive pressure; a fourth port 206 for receiving operational pressure of the second clutch C2, which operates in third, fourth, fifth, and sixth speeds; a fifth port 208 that supplies hydraulic pressure supplied to the first port 201 to the fourth clutch C4 through the third fail-safe valve 134; a sixth port 210 for returning hydraulic pressure supplied to the second port 203; and a seventh port 212 for returning the hydraulic pressure supplied to the fifth port 208.

A valve spool provided within the valve body of the switch valve 128 includes a first land 214 on which hydraulic pressure supplied through the third port 205 acts, a second land 216 for selectively opening and closing the fifth port 208 and the seventh port 212, a third land 218 for selectively opening and closing the first port 201 and the fifth port 208, a fourth land 220 for selectively opening and closing the first port 201 and the second port 203, and a fifth land 222 on which hydraulic pressure supplied through the fourth port 206 acts.

With this structure, if drive pressure is supplied to the third port 205 in the first speed of the drive D range or the reverse R range, the valve spool is displaced leftward (in the drawing), and the first port 201 and the second port 203 are opened such that control pressure of the first pressure control valve 118 is supplied to the first brake B1 through the first fail-safe valve 130.

Also, in the third and fourth speeds of the drive D range, the valve spool is displaced rightward (in the drawing) while second clutch pressure is supplied to the fourth port 206, and although the first port 201 and the fifth port 208 are communicated, hydraulic pressure is not supplied to the first port. In the fifth and sixth speeds of the drive D range, hydraulic pressure is supplied to the first pressure control valve 118 such that operational pressure is supplied to the fourth clutch C4 through the third fail-safe valve 134.

A valve body of the first fail-safe valve 130 includes a first port 230 that receives N range pressure, a second port 232 receiving hydraulic pressure from the switch valve 128, a third port 234 receiving operational pressure of the second brake B2, a fourth port 236 receiving operational pressure of the second clutch C2, a fifth port 238 that supplies hydraulic pressure supplied to the second port 232 to the first brake B1, a sixth port 240 connected to the fifth port 238 and a shuttle valve that supplies hydraulic pressure to the first brake B1 in the reverse R range, a seventh port 242 for receiving hydraulic pressure supplied to the second port 232 in the reverse R range, an eighth port 244 in communication with the seventh port 242 and a bypass line to supply hydraulic pressure to the sixth port 240, a ninth port 246 for exhausting hydraulic pressure supplied to the fifth port 238, and an exhaust port EX that exhausts hydraulic pressure supplied to the seventh port 242.

A valve spool provided within the valve body of the fail-safe valve 130 is achieved through first and second valve spools 248 and 250, which are provided with a spring 252 interposed therebetween. The first valve spool 248 includes a first land 254 on which hydraulic pressure supplied through the first port 230 acts, a second land 258 for selectively opening and closing the second port 232 and the seventh port 242, and a third land 256 for selectively opening and closing the second port 232 and the fifth port 238. The second valve spool 250 includes a first land 260 on which hydraulic pressure supplied through the third port 234 acts, a second land 262 operating between the third port 234 and the eighth port 244, a third land 264 on which hydraulic pressure supplied through the fourth port 236 acts, and that opens and closes the sixth port 240 and the eight port 244.

A valve body of the second fail-safe valve 132 includes a first port 270 that receives drive pressure, a second port 272 for receiving control pressure of the second pressure control valve 120, third and fourth ports 274 and 276 receiving operational pressures of the first and second clutches C1 and C2 respectively, a fifth port 278 receiving reverse pressure, a sixth port 280 for supplying hydraulic pressure supplied through the second port 272 to the second brake B2, a seventh port 282 for exhausting hydraulic pressure supplied through the sixth port 280, and an exhaust port EX that is positioned between the first and second ports 270 and 272.

A valve spool provided within the valve body of the second fail-safe valve 132 includes a first land 284 on which hydraulic pressure supplied through the first port 270 acts, a second land 286 operating between the second port 272 and the exhaust port EX, a third land 288 for selectively communicating the sixth port 280 with the second port 272 and the seventh port 282, a fourth land 290 operating between the fourth port 276 and the seventh port 282, a fifth land 292 operating between the third and fourth ports 274 and 276, and a sixth land 294 on which hydraulic pressure supplied to the fifth port 278 acts.

A valve body of the third fail-safe valve 134 includes a first port 300 receiving control pressure of the fifth pressure control valve 126, a second port 302 receiving hydraulic pressure from the switch valve 128, a third port 304 receiving D range pressure from the manual valve 112, a fourth port 306 for supplying hydraulic pressure supplied to the second port 302 to the fourth clutch C4, a fifth port 308 returning hydraulic pressure supplied to the fourth port 306, and a sixth port 310 returning hydraulic pressure supplied to the third port 304.

A valve spool provided in the valve body of the third fail-safe valve 134 includes a first land 312 on which hydraulic pressure supplied to the first port 300 acts, a second land 314 for selectively opening and closing the second port 302 and the fourth port 306, a third land 316 operating between the second and third ports 302 and 304, and a fourth land 318 operating between the third port 304 and the sixth port 310.

The second, third, fourth, and fifth pressure control valves 120, 122, 124, and 126 are identical in structure to the first pressure control valve 118. However, the second pressure control valve 120 selectively supplies control pressure of the second solenoid valve S2 as control pressure to the second brake B1 and the first fail-safe valve 130 through the second fail-safe valve 132. Also, the third pressure control valve 122 supplies control pressure of the third solenoid valve S3 as control pressure to the first clutch C1 and the second fail-safe valve 132. The fourth pressure control valve 124 selectively supplies control pressure of the fourth solenoid valve S4 as control pressure to the second clutch C2, the first and second fail-safe valves 130 and 132, and the switch valve 128. The fifth pressure control valve 126 supplies control pressure of the third solenoid valve S3 to the third clutch B3 and the third fail-safe valve 134.

With a hydraulic control system structured as in the above, in the neutral N range, control pressure of the first pressure control valve 118 and the fifth pressure control valve 126 is supplied to the first and third brakes B1 and B3 by the Off control of the first and fifth solenoid valves S1 and S5. In the first speed of the drive D range, by the Off control of the first, third, and fifth solenoid valves S1, S3, and S5, control pressure of the first pressure control valve 118 is supplied to the first brake B1 through the switch valve 128 and the first fail-safe valve 130, and control pressure of the third and fifth pressure control valves 122 and 126 is directly supplied to the first clutch C1 and the third brake B3.

In the second speed of the drive D range, by the Off control of the second, third, and fifth solenoid valves S2, S3, and S5, control pressure of the second pressure control valve 120 is supplied to the second brake B2 via the second fail-safe valve 132, and control pressure of the third and fifth pressure control valves 122 and 126 is supplied to the first clutch C1 and the third brake B3.

In the third speed of the drive D range, by the Off control of the third, fourth, and fifth solenoid valves S3, S4, and S5, control pressures of the third, fourth, and fifth pressure control valves 122, 124, and 126 are directly supplied to the first clutch C1, the second clutch C3, and the third brake B3.

In the fourth speed of the drive D range, by the Off control of the second, fourth, and fifth solenoid valves S2, S4, and S5, control pressure of the second pressure control valve 120 is supplied to the second brake B2 through the second fail-safe valve 132, and control pressures of the fourth and fifth pressure control valves 124 and 126 are directly supplied to the second clutch C2 and the third brake B3.

In the fifth speed of the drive D range, by the Off control of the first, third, and fourth solenoid valves S1, S3, and S4, control pressure of the first pressure control valve 118 is supplied to the fourth clutch C4 via the switch valve 128 and the third fail-safe valve 134, and control pressures of the third and fourth pressure control valves 122 and 124 are supplied directly to the first clutch C1 and the second clutch C2.

In the sixth speed of the drive D range, by the Off control of the first, second, and fourth solenoid valves S1, S2, and S4, control pressure of the first pressure control valve 118 is supplied through the fourth clutch C4 via the switch valve 128 and the third fail-safe valve 134, control pressure of the second pressure control valve 120 is supplied to the second brake B2 through the second fail-safe valve 132, and control pressure of the fourth pressure control valve 124 is directly supplied to the second clutch C2.

In the fifth and sixth speeds of the drive D range, the ability of control pressure of the first pressure control valve 118 to be supplied to the fourth clutch C4 is made possible by pressure of the second clutch C2 being supplied as control pressure to the switch valve 128 such that the valve spool is moved rightward (in the drawing) to thereby realize line conversion.

In the reverse R range, by the Off control of the first and fifth solenoid valves S1 and S5, control pressure of the first pressure control valve 118 is supplied to the first brake B1 through the switch valve 128 and the first fail-safe valve 130, control pressure of the fifth pressure control valve 126 is directly supplied to the third brake B3, and reverse pressure from the manual valve 112 is directly supplied to the third clutch C3 to thereby realize shifting into the reverse R range.

In the six-speed powertrain and the hydraulic control system for operating the same as described above, engine power is efficiently used to thereby improve power performance, shift feel, and fuel consumption.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A six-speed powertrain for a vehicle, comprising:
   a main shift section realized through first and second single pinion planetary gearsets, in which a first planet carrier, which acts as an output element, is fixedly connected to a second ring gear, a first ring gear is fixedly connected to a second planet carrier, and a first sun gear, the second planet carrier, and a second sun gear are variably connected to an input shaft with first, second, and third clutches respectively interposed therebetween, a connecting member connecting the first ring gear and the second planet carrier being variably connected to a housing through a first brake and a first one-way clutch, and the second sun gear being variably connected to the housing by a second brake; and
   a secondary shift section realized through a third single pinion planetary gearset, in which a third sun gear is connected to a third planet carrier, which operates as an output element, with a fourth clutch interposed therebetween, and which is also connected to the housing through a third brake and a second one-way clutch,
   wherein the main shift section and the secondary shift section are mounted along a common axis.

2. The powertrain of claim 1, wherein the first clutch is mounted between the main shift section and the secondary shift section, the second clutch is mounted to a torque converter, the third clutch is mounted between the second clutch and the second single pinion planetary gearset, and the fourth clutch is mounted to the third planet carrier.

3. The powertrain of claim 1, wherein the first brake and the first one-way clutch are mounted in parallel, and they variably connect the first ring gear and the second planet carrier to the housing.

4. The powertrain of claim 1, wherein the third clutch and the second brake are mounted in parallel, and they are variably connected to a power transmission member, which is directly connected to the second sun gear.

5. The powertrain of claim 1, wherein the fourth clutch is mounted to the third planet carrier and to the third brake, and the second one-way clutch is mounted to the third sun gear and to the third brake.

6. The powertrain of claim 1, wherein the third single pinion planetary gearset that operates in the secondary shift section includes a large pinion gear and a small pinion gear, which are integrally formed and rotatably mounted to the third planet carrier, the large pinion gear being meshed with the third ring gear and the small pinion gear being meshed with the third sun gear.

7. A hydraulic control system, in which hydraulic pressure generated in an oil pump is controlled to a predetermined level, and part of this pressure is supplied as operational pressure to a damper clutch and to a reducing valve, and another part of this pressure is selectively supplied to a plurality of friction elements through a manual valve and a hydraulic control distribution assembly, wherein the manual valve is indexed with a driver-manipulated select lever and includes three conversion paths for a reverse R range, neutral N and park P ranges, and a drive D range, wherein in the hydraulic control distribution assembly, hydraulic pressure of a first pressure control valve generated by a first solenoid valve, which controls line pressure supplied from a pressure regulating valve, is supplied through a switch valve to a first brake in a first speed of the drive D range and the reverse R range via a first fail-safe valve, and to a fourth clutch through a third fail-safe valve in a fifth and sixth speed of the drive D range, wherein hydraulic pressure of the second pressure control valve generated by a second solenoid valve, which controls D range pressure supplied from the manual valve, is supplied as control pressure to the first fail-safe valve and a second brake operating in second, fourth, and sixth speeds of the drive D range through a second fail-safe valve, wherein hydraulic pressure of a third pressure control valve generated by a third solenoid valve, which controls the D range pressure supplied from the manual valve, is supplied as control pressure to the second fail-safe valve and a first clutch operating in first, second, third, and fifth speeds of the drive D range, wherein hydraulic pressure of a fourth pressure control valve generated by a fourth solenoid valve, which controls the D range pressure supplied from the manual valve, is supplied as control pressure to a second clutch operating in the third, fourth, fifth, and sixth speeds of the drive D range, and to the first fail-safe valve and the switch valve, wherein hydraulic pressure of a fifth pressure control valve generated by a fifth solenoid valve, which controls line pressure supplied from the pressure regulating valve, is supplied to the third fail-safe valve and a third brake operating in the neutral N range, the reverse R range, and in the first, second, third, and fourth speeds of the drive D range, and wherein reverse pressure from the manual valve when shifting into the reverse R range is supplied directly to the third clutch and simultaneously as control pressure to the second fail-safe valve.

8. The hydraulic control system of claim 7, wherein a proportional control solenoid valve is mounted between the reducing valve and the pressure regulating valve by a transmission control unit.

9. The hydraulic control system of claim 7, wherein the first, second, third, fourth, and fifth solenoid valves comprise three-way valves that are opened when controlled Off.

10. The hydraulic control system of claim 7, wherein the pressure regulating valve comprises:

a valve body including first, second, and third ports communicating with the oil pump, a fourth port receiving control pressure of a solenoid valve for controlling line pressure, a fifth port receiving reverse pressure when in the reverse R range, a sixth port that returns part of the hydraulic pressure supplied to the first port, and a seventh port for returning hydraulic pressure remaining in the valve body; and a valve spool provided within the valve body including a first land on which hydraulic pressure supplied through the fourth port acts, a second land on which hydraulic pressure supplied through the second port acts, a third land on which hydraulic pressure supplied through the fifth port acts, a fourth land on which hydraulic pressure supplied through the seventh port acts, a fifth land that selectively opens and closes the first port and the sixth port, and a sixth land that opens and closes the third port, the sixth land being elastically supported by a spring, which is secured by an adjust screw on an opposite end.

11. A six-speed, hydraulically controlled powertrain for a vehicle, comprising:

a main shift section including first and second single pinion planetary gearsets, wherein a first planet carrier acting as an output element is fixedly connected to a second ring gear, a first ring gear is fixedly connected to a second planet carrier, and a first sun gear, the second planet carrier, and a second sun gear are variably connected to an input shaft with first, second, and third clutches respectively interposed therebetween, a connecting member connecting the first ring gear and the second planet carrier is variably connected to a housing through a first brake and a first one-way clutch, and the second sun gear is variably connected to the housing by a second brake;

a secondary shift section including a third single pinion planetary gearset, wherein a third sun gear is connected to a third planet carrier, which operates as an output element, with a fourth clutch interposed therebetween, and which is also connected to the housing through a third brake and a second one-way clutch, wherein the main shift section and the secondary shift section are mounted along a common axis;

a manual valve indexed with a driver-manipulated select lever, including three conversion paths for a reverse R range, neutral N and park P ranges, and a drive D range, wherein reverse pressure from the manual valve when shifting into the reverse R range is supplied directly to the third clutch and simultaneously as control pressure to a second fail-safe valve;

a first pressure control valve supplying hydraulic pressure through a switch valve to the first brake in a first speed of the drive D range and the reverse R range via a first fail-safe valve, and to the fourth clutch through a third fail-safe valve in a fifth and sixth speed of the drive D range, the hydraulic pressure of the first pressure control valve being generated by a first solenoid valve, which controls line pressure supplied from a pressure regulating valve;

a second pressure control valve supplying hydraulic pressure as control pressure to the first fail-safe valve and the second brake operating in second, fourth, and sixth speeds of the drive D range through the second fail-safe valve, the hydraulic pressure of the second pressure control valve being generated by a second solenoid valve, which controls D range pressure supplied from the manual valve;

a third pressure control valve supplying hydraulic pressure as control pressure to the second fail-safe valve and the first clutch operating in first, second, third, and fifth speeds of the drive D range, the hydraulic pressure of the third pressure control valve being generated by a third solenoid valve, which controls the D range pressure supplied from the manual valve;

a fourth pressure control valve supplying hydraulic pressure as control pressure to the second clutch operating in the third, fourth, fifth, and sixth speeds of the drive D range, and to the first fail-safe valve and the switch valve, the hydraulic pressure of the fourth pressure control valve being generated by a fourth solenoid valve, which controls the D range pressure supplied from the manual valve; and a fifth pressure control valve supplying hydraulic pressure to the third fail-safe valve and the third brake operating in the neutral N range, the reverse R range, and in the first, second, third, and fourth speeds of the drive D range, the hydraulic pressure of the fifth pressure control valve being generated by a fifth solenoid valve, which controls line pressure supplied from the pressure regulating valve.

12. The hydraulically controlled powertrain of claim 11, wherein the first clutch is mounted between the main shift section and the secondary shift section, the second clutch is mounted to a torque converter, the third clutch is mounted between the second clutch and the second single pinion planetary gearset, and the fourth clutch is mounted to the third planet carrier.

13. The hydraulically controlled powertrain of claim 11, wherein the first brake and the first one-way clutch are mounted in parallel, and they variably connect the first ring gear and the second planet carrier to the housing.

14. The hydraulically controlled powertrain of claim 11, wherein the third clutch and the second brake are mounted in parallel, and they are variably connected to a power transmission member, which is directly connected to the second sun gear.

15. The hydraulically controlled powertrain of claim 11, wherein the fourth clutch is mounted to the third planet carrier and to the third brake, and the second one-way clutch is mounted to the third sun gear and to the third brake.

16. The hydraulically controlled powertrain of claim 11, wherein the third single pinion planetary gearset that operates in the secondary shift section includes a large pinion gear and a small pinion gear, which are integrally formed and rotatably mounted to the third planet carrier, the large pinion gear being meshed with the third ring gear and the small pinion gear being meshed with the third sun gear.

17. The hydraulically controlled powertrain of claim 11, wherein the first, second, third, fourth, and fifth solenoid valves comprise three-way valves that are opened when controlled Off.

18. The hydraulically controlled powertrain of claim 11, wherein the pressure regulating valve comprises:

a valve body including first, second, and third ports for receiving pressurized oil, a fourth port receiving control pressure of a solenoid valve for controlling line pressure, a fifth port receiving reverse pressure when in the reverse R range, a sixth port that returns part of the hydraulic pressure supplied to the first port, and a seventh port for returning hydraulic pressure remaining in the valve body; and a valve spool provided within the valve body including a first land on which hydraulic pressure supplied through the fourth port acts, a second land on which hydraulic pressure supplied through the second port acts, a third land on which hydraulic pressure supplied through the fifth port acts, a fourth land on which hydraulic pressure supplied through the seventh port acts, a fifth land that selectively opens and closes the first port and the sixth port, and a sixth land that opens and closes the third port, the sixth land being elastically supported by a spring, which is secured by an adjust screw on an opposite end.

* * * * *